Patented June 24, 1924.

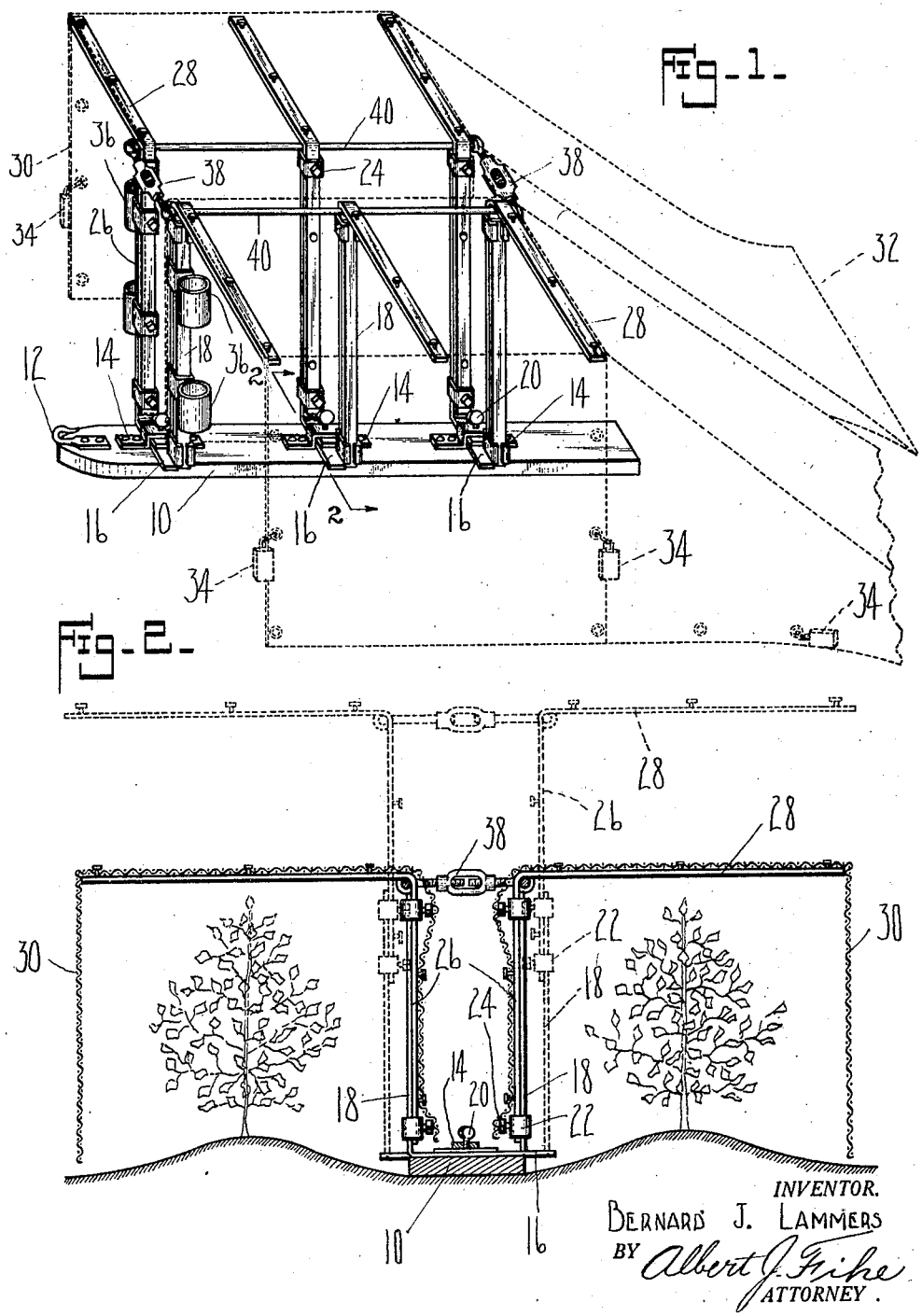

1,499,305

UNITED STATES PATENT OFFICE.

BERNARD J. LAMMERS, OF LOUISVILLE, KENTUCKY.

COTTON FUMIGATOR.

Application filed August 17, 1923. Serial No. 657,992.

*To all whom it may concern:*

Be it known that I, BERNARD J. LAMMERS, a citizen of the United States, residing at Louisville, in the county of Jefferson and State of Kentucky, have invented certain new and useful Improvements in Cotton Fumigators; and I do hereby declare the following to be a full, clear, and exact description of the invention, such as will enable others skilled in the art to which it appertains to make and use the same.

This invention relates to improvements in fumigating apparatus and is particularly adapted to be used with cotton plants for the destruction of the boll weevil or other obnoxious insects, but it will be evident that the same can be adapted to be used with other plants and for the destruction by fumigation of practically any pest.

One of the important objects of this invention is the provision of a fumigating apparatus which shall comprise in a single unit the combination of a series of fumigant receptacles and means for enveloping a plurality of plants whereby the fumes from the fumigant are maintained in active operative contact with the plants for a considerable length of time and with practically no waste of fumes.

Another important object of this invention is the provision of a fumigating apparatus which is adapted to fumigate a plurality of rows of plants at a single operation and which will moreover be adjustable so as to accommodate various sizes of plants, corresponding to different stages of growth, and also capable of being extended so as to adjust itself to variations of distances between furrows and the like.

Other and further important objects of the invention will be apparent from the disclosures in the accompanying drawings and following specification.

The invention, in a preferred form, is illustrated in the drawings and hereinafter more fully described.

In the drawings:—

Figure 1 is a detail perspective view of the improved fumigator frame of this invention shown in full lines. The dotted lines in the figure represent the canopy for the fumigator and its following train.

Figure 2 is a vertical cross section of the device taken substantially on the plane indicated by the line 2—2 in Figure 1, and the dotted lines in this figure indicate the various adjustments of which the apparatus is capable.

As shown in the drawings:—

The reference numeral 10 indicates generally a baseboard or support for the improved cotton fumigator of this invention, the design of which baseboard, of course, may be varied as desired or convenient, and which is adapted to be slid or dragged along the ground between rows of plants. A hook 12 is affixed to the forward portion of the baseboard whereby it may be readily drawn through the rows of plants in any obvious manner.

Securely attached to the baseboard at intervals along the length thereof are frame members 14 as best indicated in Figure 1 and which have central upstanding portions spaced away from the surface of the baseboard 10 and through which are adapted to pass horizontally extending legs 16 forming integral bent-over portions of vertical uprights 18.

These supporting members 16 are slidable through the frame members 14 and are adapted to be clamped in any desired position relative thereto by means of set screws or the like 20, as illustrated. This construction permits of a lateral adjustment of the vertical members 18 with respect to the baseboard 10. The effects of this adjustment are best illustrated by the dotted lines in Figure 2 whereby the device can be used with rows of plants of varying distances between the rows.

Slidably attached to each of the vertical members 18 by means of suitable clamps 22 and set screws 24 is a co-acting frame member, comprising a vertical portion 26 adapted to co-operate with the upright 18 and having an integral overhanging horizontal portion 28. These overhanging horizontal portions have a canopy 30 attached thereto in any convenient manner. This canopy 30 is made of some light cloth or other suitable material and is provided with a rearwardly extending train as illustrated at 32 in Figure 1 which is of a sufficient length to follow up and envelop a number of plants when the device is in operation. Weights 34 are applied to portions of the canopy and train as illustrated in order to securely maintain the same in operating position at all times, even against the force of winds, brush or other elements.

A series of fumigant receptacles 36 is attached to the foremost upright 18—26 as illustrated in Figure 1, and comprises cylindrical cups adapted for the reception of a chemical from which the poison fumes are derived. Adjustable brace members are also provided as illustrated at 38 connecting top portions of the frame members 26—28 by means of longitudinal extending bars 40 whereby a very substantial structure will result.

It will be seen that herein is provided a fumigator for cotton or other plants, which will effectively envelop a plurality of plants in a number of rows at one and the same time and the construction of which is such that a thorough application of the fumigant to every portion of each plant is positively assured. Moreover, the device is simple of construction and composed of a minimum of parts and thereby not likely to get out of order. Further, the same can be economically manufactured and the fumigant applied to growing plants without any danger of injuring the same by brushing against or bending said plants. This is rendered feasible by means of the ready adjustability of the frame in various dimensions.

I am aware that many changes may be made and numerous details of construction varied throughout a wide range without departing from the principles of this invention, and I, therefore, do not purpose limiting the patent granted hereon, otherwise than as necessitated by the prior art.

I claim as my invention:—

1. A fumigator for plants including in combination a base, a plurality of vertically and horizontally adjustable supports mounted on said base, and a canopy attached to said supports, said canopy provided with a train for enveloping a plurality of plants.

2. A fumigator for plants including in combination a base, a plurality of vertically and horizontally adjustable supports mounted on said base, said supports extending laterally in two directions from the base, and a canopy attached to said supports, said canopy provided with a train for enveloping a plurality of plants.

3. A fumigator for plants including in combination a base, a plurality of vertically and horizontally adjustable supports mounted on said base, a canopy attached to said supports, said canopy provided with a train for enveloping a plurality of plants, and means for locking said supports in adjusted relation.

4. A fumigator for plants including in combination a base, a plurality of vertically and horizontally adjustable supports mounted on said base, a canopy attached to said supports, said canopy provided with a train for enveloping a plurality of plants, means for locking said supports in adjusted relation, said means comprising clamping members and set screws for both horizontal and vertical adjustment and a laterally adjustable bracing frame adapted to join the tops of said supports.

5. A fumigator for plants including in combination a base, a plurality of vertically and horizontally adjustable supports mounted on said base, fumigant receptacles mounted on the fore-most of said supports, a canopy attached to said supports, said canopy provided with a train for enveloping a plurality of plants, and weights for maintaining the canopy and train in desired position.

In testimony whereof I affix my signature.

BERNARD J. LAMMERS.